(12) United States Patent
Bornia

(10) Patent No.: US 9,028,701 B2
(45) Date of Patent: May 12, 2015

(54) APPARATUS AND METHOD FOR FILTERING LIQUIDS, PARTICULARLY ORGANIC LIQUIDS

(75) Inventor: Luca Bornia, Treviso (IT)

(73) Assignee: TMCI Padovan S.p.A., Vittorio Veneto (IT)

( * ) Notice: Subject to any disclaimer, the term of this patent is extended or adjusted under 35 U.S.C. 154(b) by 479 days.

(21) Appl. No.: 13/388,823

(22) PCT Filed: Sep. 18, 2009

(86) PCT No.: PCT/IT2009/000420
§ 371 (c)(1),
(2), (4) Date: Feb. 3, 2012

(87) PCT Pub. No.: WO2011/033537
PCT Pub. Date: Mar. 24, 2011

(65) Prior Publication Data
US 2012/0132595 A1    May 31, 2012

(51) Int. Cl.
*B01D 29/88* (2006.01)
*B01D 63/16* (2006.01)
(Continued)

(52) U.S. Cl.
CPC ............ *B01D 63/16* (2013.01); *B01D 61/22* (2013.01); *B01D 65/02* (2013.01); *B01D 2311/14* (2013.01); *B01D 2311/16* (2013.01);
(Continued)

(58) Field of Classification Search
CPC ............ B01D 29/88; B01D 33/0048; B01D 33/0067; B01D 33/007; B01D 33/0077; B01D 33/21; B01D 33/463; B01D 33/48; B01D 33/806; B01D 33/808; B01D 63/16; B01D 65/08; B01D 65/02

USPC ............... 210/107, 108, 321.68, 321.69, 330, 210/331, 333.01, 393, 739, 741, 103
See application file for complete search history.

(56) References Cited

U.S. PATENT DOCUMENTS

| | | |
|---|---|---|
| 6,375,847 B1 | 4/2002 | Hartmann |
| 2005/0230311 A1 | 10/2005 | Rodenberg et al. |
| 2009/0001018 A1 | 1/2009 | Zha et al. |

FOREIGN PATENT DOCUMENTS

| | | |
|---|---|---|
| EP | 0 425 725 | 5/1991 |
| JP | 4 338219 | 11/1992 |

(Continued)

OTHER PUBLICATIONS

International Search Report Issued Jun. 25, 2010 in PCT/IT09/00420 Filed Sep. 18, 2009.

*Primary Examiner* — Heidi Kelley
*Assistant Examiner* — Akash Varma
(74) *Attorney, Agent, or Firm* — Oblon, McClelland, Maier & Neustadt, L.L.P.

(57) ABSTRACT

The present invention relates to an apparatus and a method for filtering liquid products. The apparatus includes a filtration bell provided with filtering device and connected to an inflow circuit and a first outlet circuit of the retentate, and to a second outlet circuit of the filtered liquid. The apparatus can include a monitoring and control unit, a first and second sensing device suitable for detecting the value of a first pressure PT1 in the first outlet circuit and of a second pressure PT2 in the second outlet circuit, a flow rate detection device that detects the value of a first flow rate FIT in the second outlet circuit, and value device arranged in the second circuit downstream of the second sensing device. The monitoring and control unit includes a device to control the closure of the valve device and to start a process of backwashing the filtering device.

10 Claims, 4 Drawing Sheets

(51) Int. Cl.
 *B01D 61/22* (2006.01)
 *B01D 65/02* (2006.01)
 *C12H 1/07* (2006.01)

(52) U.S. Cl.
 CPC ......... *B01D2313/18* (2013.01); *B01D 2313/48* (2013.01); *B01D 2315/02* (2013.01); *B01D 2321/04* (2013.01); *B01D 2321/30* (2013.01); *C12H 1/063* (2013.01)

(56) References Cited

FOREIGN PATENT DOCUMENTS

| | | |
|---|---|---|
| JP | 2007 105569 | 4/2007 |
| WO | 2007 079540 | 7/2007 |
| WO | 2009 076980 | 6/2009 |
| WO | WO 2009076980 A1 * 6/2009 ............. B01D 63/16 |

\* cited by examiner

APPARATUS AND METHOD FOR FILTERING LIQUIDS, PARTICULARLY ORGANIC LIQUIDS

TECHNICAL FIELD OF INVENTION

The present invention refers to an apparatus and a method for filtering liquid products, particularly organic liquids. The apparatus and the method forming the subject matter of the present invention are in fact particularly suitable for wine filtering applications in the winemaking industry.

STATE OF THE ART

Currently known systems for filtering liquids, used particularly in wine filtering, include a filtration bell containing a filtering device and connected, on one side, to a feeding tank containing the liquid to be filtered, and on the other side, to a filtered liquid collecting tank. Generally, the filtration bell is provided with two outlets: a first outlet for the filtered liquid, or "permeate", which is sent to the collecting tank, and a second outlet for the liquid that is not completely filtered due to its not having passed through the filtering device, a liquid denominated "concentrate" or "retentate"; the second outlet is connected to the feeding tank through a return circuit, where the liquid is sent in order to be reintroduced into the feeding circuit for filtration.

Among filtering systems are known systems including a number of membranes in the form of disks of microporous material stacked in arrays and integral with a rotating shaft with respect to the filtration bell. The rotation of the shaft integral with the membranes has the purpose of favouring the filtration of the liquid through the same membranes, so as to have a more effective filtration process, and also of reducing the sticking of the filtration residues to the surfaces of the membranes.

To improve the efficiency of the filtration process and maintain the state of cleanliness of the membrane filtering surfaces at an acceptable level during the filtration process, some filtration devices are equipped with a reverse filtering, or backwashing, system, the purpose of which is to carry out a washing of the filtering device at preset intervals during the filtering process so as to eliminate from the membrane surfaces the residues of particles separated from the liquid. The reverse filtering uses part of the liquid already filtered, or permeate, to wash the membranes. The permeate is intercepted along the outlet circuit toward the collecting tank and, through a reverse path along the same circuit, it is reintroduced into the filtration bell, it is made to pass through the membranes and sent back to the feeding tank along the retentate return circuit to be added into the feeding circuit and undergo a new filtration process.

Examples of plants of this type are provided by the European patent EP 0121105, by the French patent application FR 2588767 and by the international patent application WO 03/048049.

In particular, the first patent EP 0121105 describes an apparatus for filtering liquids, also including organic liquids such as wine, the apparatus including two filtering units arranged in series and in which the reverse filtering system is controlled by the pressure values detected (i) on inflow to the first filtering unit, (ii) on outflow from the same or, which is equivalent, on inflow to the second filtering unit; (iii) on outflow from the second filtering unit upstream of the unit that intercepts the filtered liquid for reverse filtering, and (iv) downstream of the intercepting unit before the filtered liquid collecting tank. The activation of the reverse filtering process is determined by the comparison of these pressure values based on a particular algorithm.

A first drawback of this system arises from the presence of two filtering units arranged in series, which involve a complexity in the construction and a considerable size of the apparatus.

In addition, the method of activating the reverse filtration based exclusively on the detection and comparison of the pressure values read at different points in the system is not completely satisfactory and reliable to guarantee the best efficiency of the operation of cleaning the filtering surfaces during the filtration process.

Another drawback caused by a scarcely efficient reverse filtration consists of the reduction of the membrane life caused by the rapid wear of the filtering surfaces.

SUMMARY OF THE INVENTION

The main task of the subject-matter of the present invention is to devise an apparatus and a method for filtering liquid products, particularly organic liquids such as wine, capable of overcoming the drawbacks of the state of the art exemplified above.

In the scope of the above task, one objective of the present invention is to devise a filtering apparatus and method that makes it possible to optimize and improve the efficiency of the work cycle, and in particular the reverse filtering process.

Another objective is to devise a filtration apparatus and method that guarantees an optimal cleaning of the filtering membranes so as to cut down wear and extend the life of the membranes, with a consequent saving in the plant operating costs.

A further objective is to devise an apparatus and method that make it possible to achieve a finer and more accurate filtration of the liquid, so that the product resulting from the filtration will be of a higher quality.

A further objective is to devise a filtering apparatus and a method substantially capable of self-adjusting or of performing a self-adaptation of the operating cycle parameters as a function of the characteristics of the liquid to be filtered and/or the conditions of the system, or based on variations from such characteristics and/or conditions during the operating cycle.

One still other objective is to devise a filtering apparatus and method that, through the optimization of the reverse filtering process, makes it possible to achieve an appreciable energy saving in the operating cycle.

A further objective is to devise a filtering apparatus and method capable of using smaller amounts of water and detergents in the end-of-cycle membrane washing phase, while guaranteeing an optimal cleanliness of the same membranes; in this manner it will be possible to obtain a further saving in the costs of operating the apparatus, which will also be more advantageous from the point of view of environmental protection.

A further objective is to devise a filtering apparatus and method that achieves the above task and objectives at competitive costs and that can be realized with the usual known machinery and equipment.

The task and the objectives indicated above, and others that will become more evident in the following description, will be achieved by a filtering apparatus and by a filtration method as discussed below.

BRIEF DESCRIPTION OF THE DRAWINGS

Further characteristics and advantages of a filtering apparatus and method according to the present invention will become more evident from the following description of a particular, but not exclusive, embodiment illustrated purely by way of example and not of limitation with reference to the enclosed figures, in which.

DETAILED DESCRIPTION OF THE INVENTION

Figure 1:
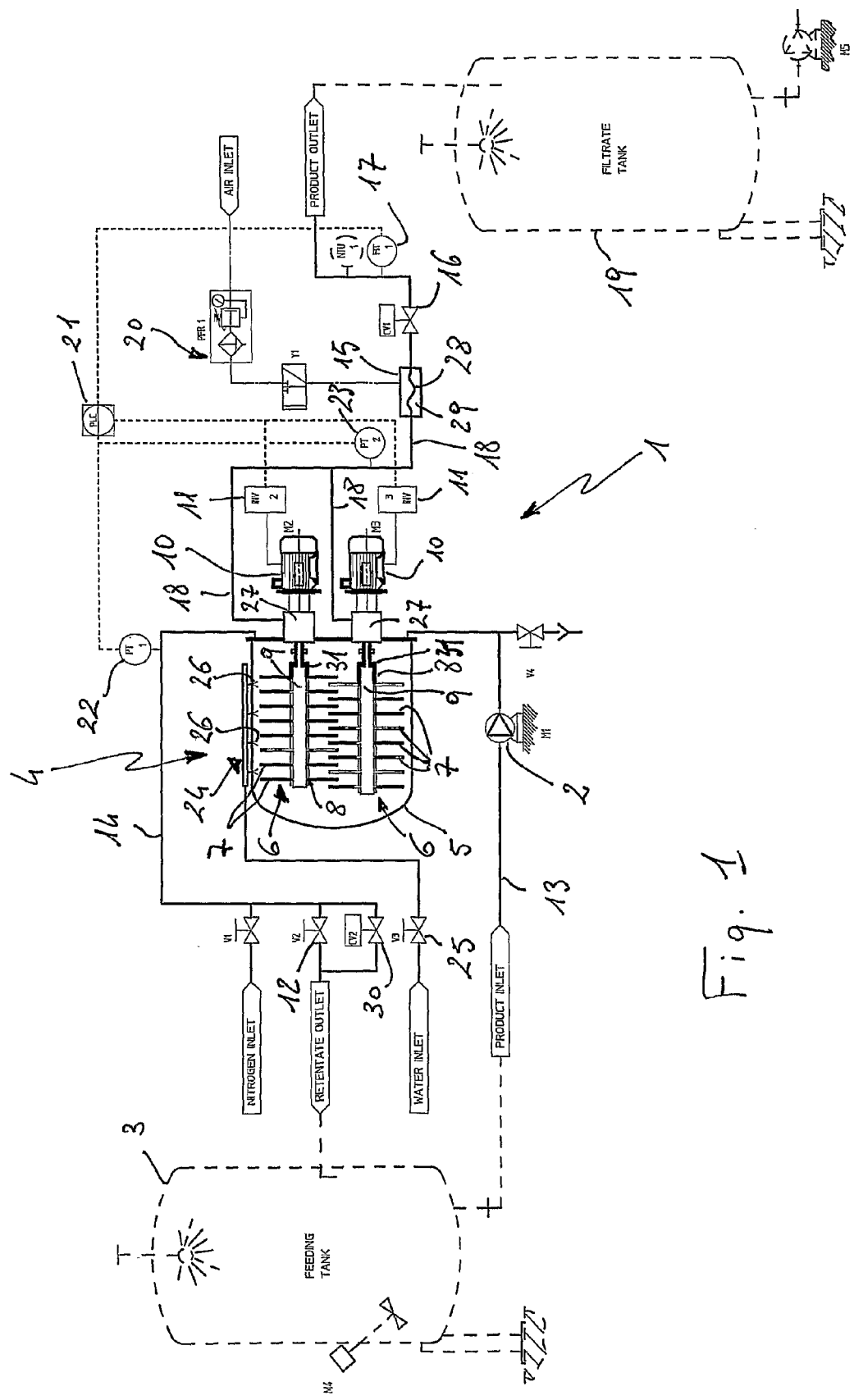
FIG. 1 is a schematic drawing of an apparatus according to the present invention.

With reference to the enclosed drawings, reference numeral 1 indicates a filtration apparatus for liquid products, particularly designed for wine-filtering applications in the winemaking industry.

The apparatus 1 includes:
- a pump 2 that draws up the liquid to be filtered from a feeding tank 3 and sends it, through a feeding circuit 13, to a filtering unit 4 that includes in turn a filtration bell 5 containing one or more filtering means 6;
- each filtering means 6 includes an array of filtering membranes 7, preferably in the form of disks of microporous material, rotatable with respect to the filtration bell 5; the filtering membranes 7 are integrally supported by a shaft 8 that is internally provided with a cavity 9 that communicates, at one end 31, with an outlet circuit 18 of the filtered liquid and is closed at the opposite end; the cavity 9 also communicates with the filtering membranes 7 through one or more ducts within the same membranes 7 and arranged substantially in a radial direction to allow the outflow of the filtered liquid from the filtration bell 5; the shaft 8 is rotatably supported by the filtration bell 5 and the rotation movement is given by an electric motor 10 connected to and controlled by an inverter 11, preferably servo-ventilated;
- a first valve 12, preferably manually controlled, installed in a return circuit 14 for the unfiltered liquid, called concentrate or retentate, suitable to create a pressure differential in the same circuit 14 that reflects in the filtration bell 5, and therefore also on the filtering membranes 7; the return circuit 14 includes a controlled deviation controlled by a fourth valve 30, preferably servo-controlled;
- a second valve 15 and a third valve 16, preferably servo-controlled, and means to detect the flow rate 17 and arranged in sequence along a filtered liquid, or permeate, outlet circuit 18 toward the collecting tank 19; preferably, the second valve 15 is pneumatically driven, and therefore it is connected to pneumatic actuation means 20;
- first sensing means 22 to detect the pressure PT1 in the retentate return circuit 14;
- second sensing means 23 to detect the pressure PT2 in the permeate outlet circuit 18;
- a monitoring and control unit 21 to which are connected for signal communication the first sensing means 22 and the second sensing means 23 for the detection and acquisition, respectively, of the pressures of the retentate liquid (PT1) and of the permeate liquid (PT2), the inverters 11 controlling the electric motors 10, and the means 17 of detection and acquisition of the permeate liquid rate of flow toward the collecting tank 19;
- washing means 24 for the filtering membranes 7, said washing means connected, through an interposed fifth valve 25 preferably manually controlled, to the water supply or to a hydraulic circuit; the washing means 24 include a plurality of nozzles 26 arranged perpendicularly to the longitudinal extension of the filtration bell 5 so that the water jets hit the filtering membranes 7 tangentially.

Figure 2:
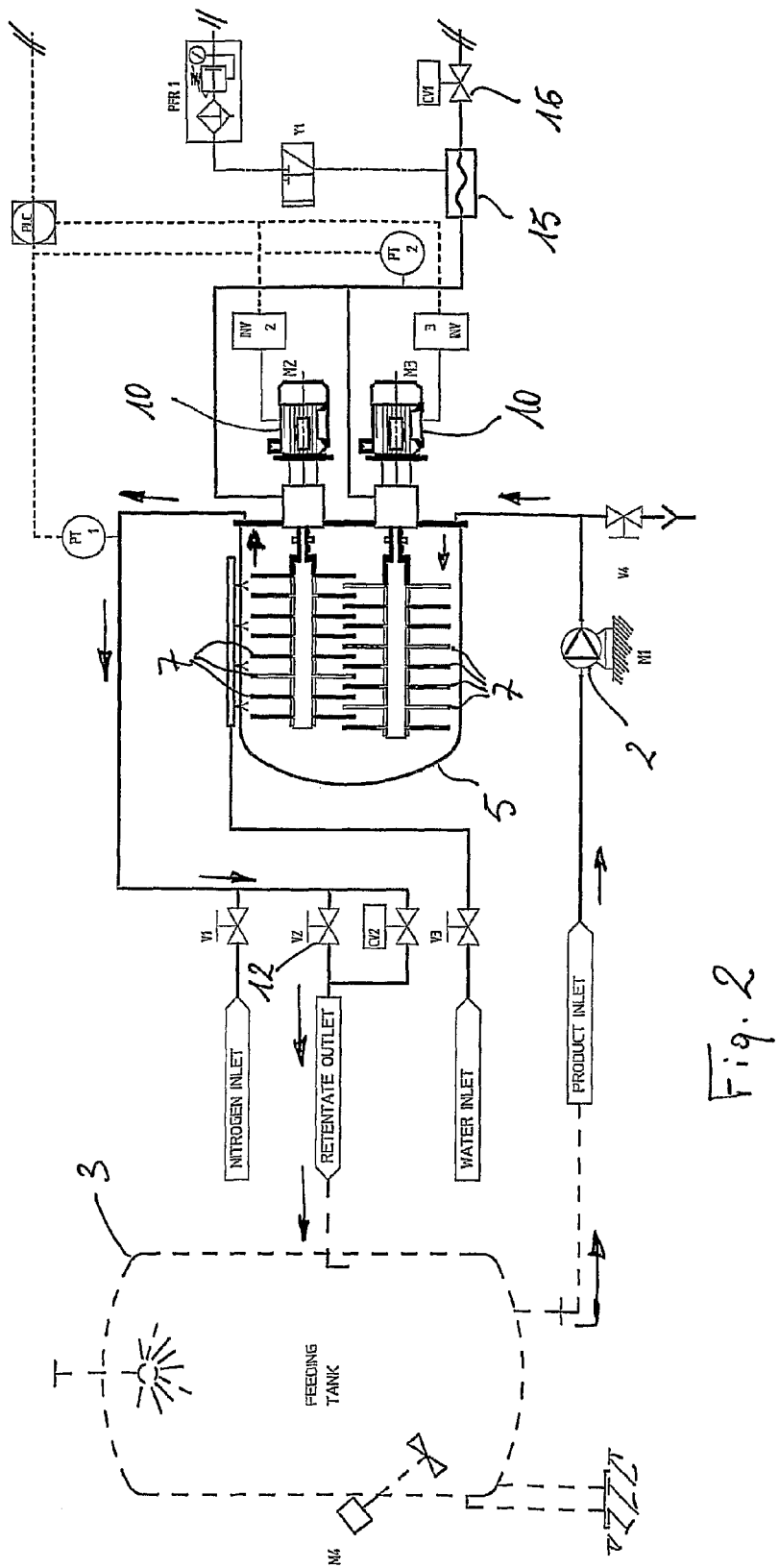
FIG. 2 is a schematic drawing of a preliminary phase of filling and starting the system.

The operation of the apparatus is as follows: after a first preliminary phase of filling the filtration bell 5, in which the liquid is drawn from the feeding tank 3 through the pump 2 and circulated, with the filtering membranes 7 in stopped position, in the filtration bell 5 and from this to the feeding tank 3 (FIG. 2), there is a second preliminary phase to start the rotation of the membranes 7 by activating the motor 10 and partly choking the first valve 12 to the desired pressure value PT1 to create a pressure differential in the filtration bell 5; the second and the third valve 15, 16 are brought to the open position.

Figure 3:
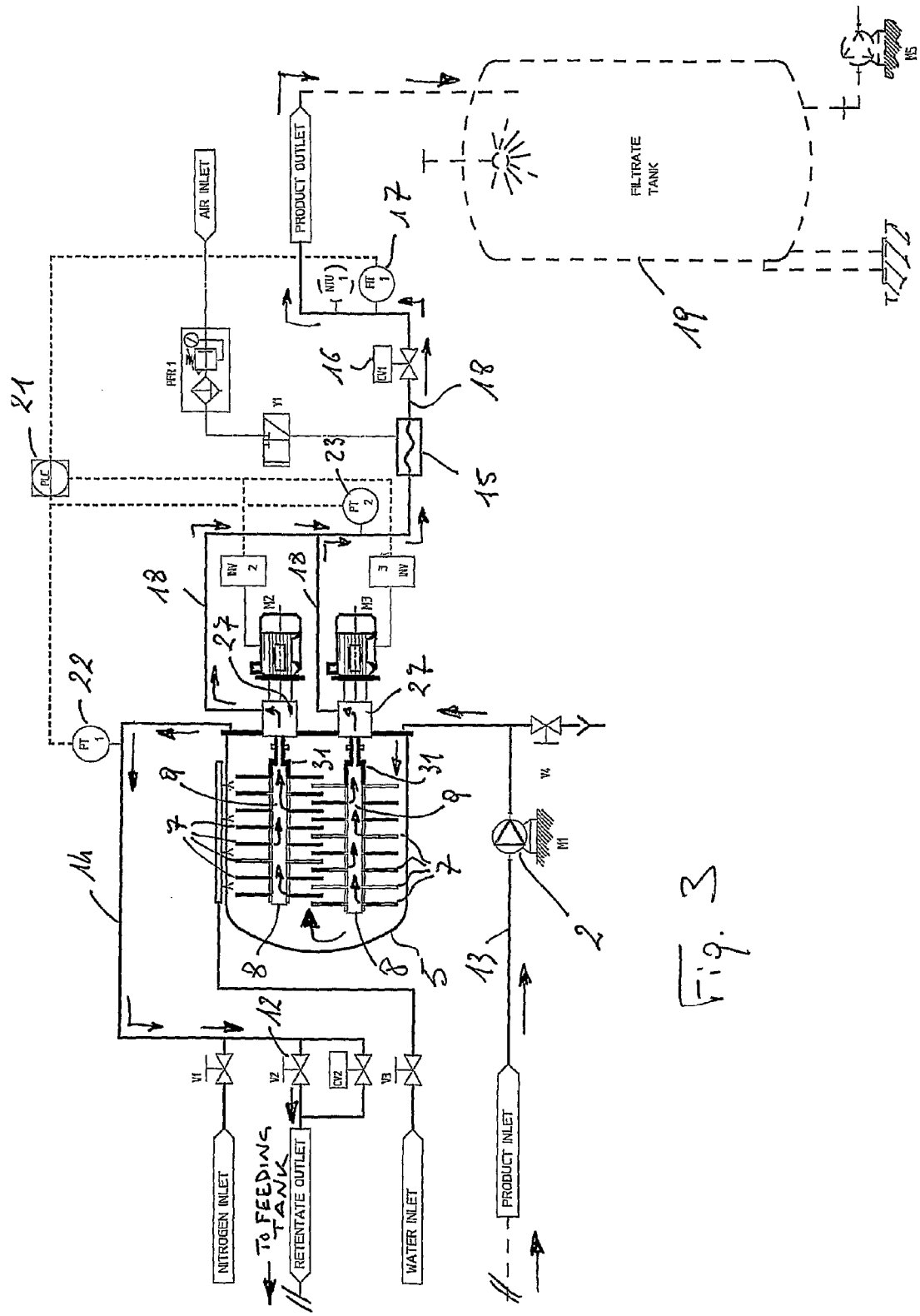
FIG. 3 is a schematic drawing of an operating phase of the filtration cycle.

At the completion of the preliminary filling and start-up phases, the apparatus is brought to its regular running state and starts the filtration cycle is started (FIG. 3), during which the liquid to be filtered is drawn from the feeding tank 3 through the pump 2 and sent to the filtration bell 5 through the feeding circuit 13; the pressure differential in the filtration bell 5, created by the first valve 12 adjusted to the pressure PT1 and by the pressure drop to which the filtrate is subjected through the filtering means, favours the passage of the liquid through the filtering membranes 7, which in this manner is filtered by permeating through the disks of microporous material. The rotation of the membranes 7 makes it possible to reduce their clogging due to the self-cleaning effect obtained on the filtering surfaces of the disks determined by the tangential speed created by rotation.

The liquid that is filtered through the membranes 7, technically denominated "permeate", enters into the cavity 9 of the shaft 8 through the radial ducts found within each membrane 7 and flows along the cavity 9 until it exits the filtration bell 5 through the open end 31 of the shaft 8 communicating with a conveyor 27; the liquid that could not pass through the filtering membranes 7, technically denominated "concentrate" or "retentate", exits the filtration bell 5 through the retentate return circuit 14, through which it returns to the feeding tank 3, mixing with the unfiltered liquid to be let into the cycle again; at the outlet from the filtration bell 5 and upstream of the first valve 12 the pressure value PT1 of the retentate is detected by the first sensing means 22.

From the conveyor 27, the permeate is conveyed along the outlet circuit 18 toward the collecting tank 19; downstream of the conveyor 27, and with the second and third valve 15, 16 open, the pressure values PT2 and the flow rate values FIT1 of the permeate are detected before the entrance into the collecting tank 19 by means of the second sensing means 23 and the detection means 17, respectively.

During the filtration cycle, a reverse filtration or "backwashing" cycle, controlled by the monitoring and control unit 21, is carried out at determined intervals on the basis of the detected pressure and flow values, as will be better explained in the description hereunder. The monitoring and control unit 21 acquires the pressure value PT1 detected by the first sensing means 22, the pressure value PT2 detected by the second sensing means 23 and the permeate flow rate value FIT detected by the flow sensing means 17, and performs a comparison with preset values of the difference Dp between the PT1 and PT2 pressure values, which we will define DpSet, and of a preset flow-rate value, which we will define FITSet. The above values are detected at predetermined intervals $\Delta T$, conveniently preset at 60 seconds. The comparison process is performed by the monitoring and control unit 21 as follows:

(i) the pressure difference between PT1 and PT2 is calculated and compared with DpSet:

$$PT1-PT2=Dp$$

if Dp≤DpSet, the value of P=1 is assigned, whereas
if Dp>DpSet, the value of P=Dp/DpSet is assigned;
(ii) the flow rate value FIT detected is compared with FITSet:
if FITSet≤FIT, the value of F=1 is assigned, whereas
if FITSet>FIT, the value of F=FIT/FITSet is assigned;
(iii) the value of k=(P+F)/2 is calculated:
if k≤1, the time period previously set is confirmed to start a new reverse filtering cycle; if at the end of the time period the condition is still k≥1, the cycle start is postponed to a subsequent check, carried out after a time interval ΔT, until the condition of k<1 is reached;
if k<1, a new reverse filtering cycle is started and the time interval between the new cycle and the previous cycle is memorized in the monitoring and control unit 21.

When the monitoring and control unit 21 supplies the consent signal to start the reverse filtering cycle, the same unit 21 actuates the closure of the third valve 16, which shuts off the permeate flowing toward the collecting tank 19, and then closes the second valve 15. Advantageously, the latter is a pneumatically controlled valve that includes a sleeve 28 of elastically deformable material suitable to be compressed by actuation means 20, such as for example compressed air or other gaseous fluid injected in a pneumatic circuit, and a body 29 in communication with the pneumatic circuit. The permeate flows within the sleeve 28, and the compression of the sleeve shuts off the flow of permeate toward the collecting tank 19, while the air or gas, injected into the body 29, are prevented from coming into contact with the permeate.

Figure 4:
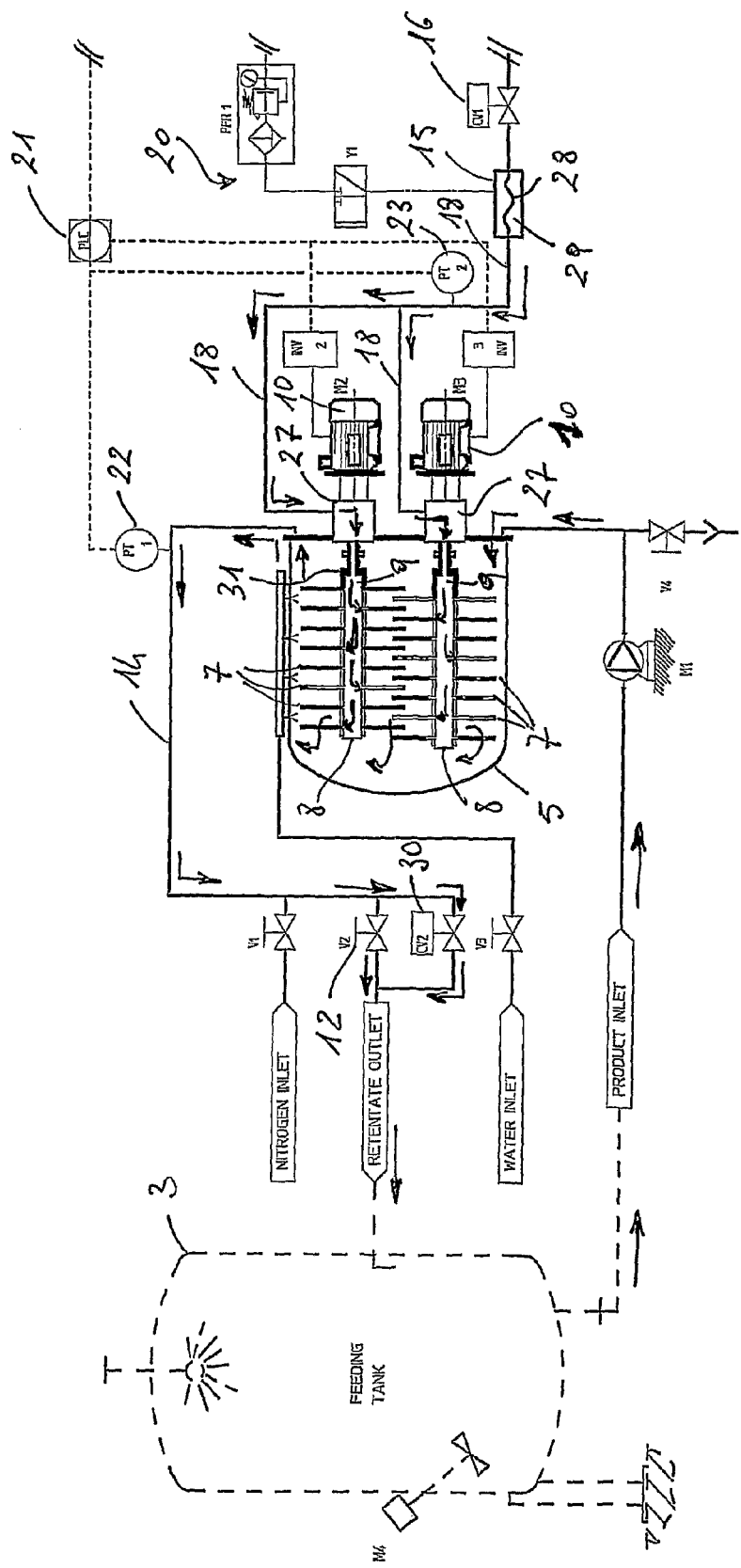
FIG. 4 is a schematic drawing of an operating phase of the reverse filtration cycle.

The permeate then flows backward along the outlet circuit 18 (FIG. 4), returning toward the conveyor 27 due to the back pressure created by the closure of the sleeve 28 and the opening of a fourth valve 30 located in a shunt in the return circuit 14 to favour the outflow of the retentate bypassing temporarily the first valve 12, partly choked to the pressure PT1.

From the conveyor 27, the permeate is fed into the cavity 9 of the shaft 8 through the opening at the end 31 connected to the motor 10. The permeate then flows into the radial ducts inside the membranes 7 and passes through the filtering surfaces of the same membranes 7, thereby removing particles and residues held on those surfaces, thus synergically increasing the cleaning action given by only the continuous rotation of the membranes 7. The liquid, which now contains the residues and particles removed from the membranes 7, flows out of the filtration chamber 5 through the retentate return circuit 14, where the flow is facilitated by the opening of the fourth valve 30, and is fed again into the filtration cycle through the feeding tank 3.

For convenience, the duration of the reverse filtering cycle described above is preset on the average at about 5 seconds, although the operator may vary this duration through the monitoring and control unit 21.

Once the reverse filtering cycle is completed, the normal cycle resumes, and the monitoring and control unit 12 opens the second and the third valve 15, 16 and restores the normal flow of the liquid from the feeding tank 3 toward the collecting tank 19 through the filtering unit 4.

Another aspect of the present invention is the ability to adjust the speed of the motor 10 based on the viscosity of the liquid to be filtered and/or the extent of clogging of the membranes 7. The determination of the viscosity and/or of the degree of clogging is made on the basis of the motor 10 power input and of the permeate pressure PT2. The values sensed are sent to the monitoring and control unit 21 which, through a suitable processing, transmits an rpm variation signal to the inverter 11.

A further aspect of the present invention consists of the washing means 24 with the nozzles 26 turned so as to carry out, at the end of the cycle, a tangential washing of the membranes 7. This type of washing has proven to be particularly effective to quickly remove the organic and inorganic matter that settles on the membranes 7, making it possible to cut down the consumption of water and washing detergents. The effectiveness of this washing, combined with the continuous rotation of the membranes 7 and the reverse filtration optimized on the basis of the effective extent of membrane clogging, makes it possible to extend the life of the membranes 7, in addition to considerably cutting down the overall energy consumption of the apparatus.

According to a preferred embodiment, illustrated in FIGS. 1 to 4, a greater filtering capacity of the apparatus can be achieved by increasing the number of filtering means 6, which may include two or more shafts 8 driven by respective motors 10. The shafts 8 are arranged on parallel axes and support respectively a first and a second series of filtering membranes 7, which are advantageously arranged in "interleaved" fashion, that is, reciprocally alternated in longitudinal direction, so that the respective disks at least partially overlap each other. Each cavity 9 of the shafts 8 will therefore be in communication with a respective conveyor 27 which is itself provided with respective permeate outlets connected to the outlet circuit 18. The pressure PT2 will thus be sensed downstream of the connectors coupling the sections of the conveyor outlet circuit to the outlet circuit 18.

From the above, it is evident how the present invention achieves the objectives and advantages initially foreseen: in fact, the present inventors have devised an apparatus and a method for filtering liquid products, in particular organic liquids such as wine, capable of overcoming the drawbacks of the previous state of the art mentioned in the preamble of the present description.

The apparatus and the method described above make it possible to optimize and improve the efficiency of the work cycle, and in particular the reverse filtering process, thanks to the capacity to start this process only when actually necessary based on the pressure and flow-rate parameters detected and processed by the monitoring and control unit 21. This avoids the possibility of starting the reverse filtering process too early with respect to the degree of clogging of the filtering membranes 7, resulting in a reduced efficiency of the apparatus and an unnecessary energy consumption, or of starting it late, when the filtering capacity of the membranes 7 has drastically declined due to clogging, again with the consequent reduced efficiency of the apparatus, because the quantity and quality of the permeate decreases, and moreover resulting in a reduction in the useful life of the membranes 7 and in the difficulty of removing the filtration residues on the filtering surfaces.

One significant advantage resulting from said operating modes of the reverse filtering process consists of the optimal cleaning of the filtering membranes 7 during all the filtering process, which makes it possible to reduce their wear and to extend their useful life, with a consequent saving in terms of the costs of operating the apparatus.

A further advantage of the apparatus and of the method according to the present invention lies in the capacity of achieving a finer and more accurate filtration of the liquid, thanks to the constant and optimal cleaning of the filtering membranes 7 provided, in a synergic manner, by the tangential speed caused by the rotation of the disks that continually removes the less resistant particles, by the optimal modes of controlling and starting the reverse filtering process as described above and by the tangential washing of the membranes 7 carried out at the end of the cycle by the washing means 24. With particular reference to this last washing phase, it is pointed out that it is possible to considerably reduce the use of water and detergents, thanks to the optimal degree of cleanliness of the membranes that is already achieved during the filtration cycle. This important aspect makes it possible to further reduce the costs of operating the apparatus, making it at the same time particularly advantageous at the ecological level.

One other advantage of the filtering apparatus and method according to the present invention lies in the substantial self-adjusting or self-adapting capacity of the work cycle parameters based on the characteristics of the liquid to be filtered as, for example, viscosity, and/or on the conditions of the apparatus, such as the degree of clogging of the membranes 7, or based on the variation of said characteristics during the same work cycle, owing to the centralized monitoring and control unit 21 which receives and processes the values detected during the work cycle to activate the reverse filtering process or the variation of the rpm of the motors 10 through the inverters 11. These capacities of self-adjustment and optimization of the apparatus translate in the end into a better utilization of the apparatus and into a considerable energy saving, and therefore into an overall reduction of process costs.

Naturally, the present invention is open to the possibility of many applications, modifications or variations without departing from the scope of protection as defined by the independent claims.

In addition, the materials and equipment used to realize the present invention, as well as the shapes and dimensions of the individual components, may be the most suitable to fit the particular requirements.

The invention claimed is:

1. An apparatus for filtering liquid products, particularly organic liquids, including a filtration bell provided with filtering means including an array of rotating filtering membranes, said filtration bell being connected, on one side, to a feeding circuit adapted to draw the liquid to be filtered from a feeding tank to said filtration bell and, on an other side, to a retentate return circuit, and to a permeate outlet circuit, said apparatus further comprising:

a monitoring and control unit;

first sensing means connected for signal communication with said monitoring and control unit and suitable for detecting and acquiring at preset time intervals $\Delta T$ a value of a first pressure PT1 in said return circuit;

second sensing means connected for signal communication with said monitoring and control unit and suitable for detecting and acquiring at preset time intervals $\Delta T$ a value of a second pressure PT2 in said outlet circuit;

flow rate detection means in signal communication with said monitoring and control unit and suitable for detecting and acquiring at preset time intervals $\Delta T$ a flow rate value FIT in said outlet circuit;

first valve means for controlling a flow rate in the permeate outlet circuit, the first valve means being arranged in said permeate outlet circuit downstream of said second sensing means and controlled by said monitoring and control unit, said first valve means being set in an open position during a filtration cycle;

said monitoring and control unit including means for comparing and processing the values of said first pressure PT1, said second pressure PT2 and said flow-rate value FIT with respect to respective preset values to control a closure of said first valve means such that said permeate flows backward along said outlet circuit to start a backwashing process of said rotating filtering membranes;

and second valve means for creating a pressure differential are provided in said retentate return circuit, wherein the control unit is configured to adjust said second valve means and said first pressure PT1 during said filtration cycle to create a pressure differential in said filtration bell and to open said second valve means during said backwashing process to allow said permeate flowing backward along said permeate outlet circuit into said filtration bell and then flowing out said filtration bell through said retentate return circuit to be fed again into said feeding circuit through said feeding tank, said rotating filtering membranes continuing to rotate during said backwashing process.

2. The apparatus as claimed in claim 1, wherein said rotating filtering membranes are stacked and integral to a shaft rotating with respect to said filtration bell and provided internally with at least one cavity in communication, at one end, and, at the other end, with said permeate outlet circuit.

3. The apparatus as claimed in claim 2, wherein during said backwashing process said permeate is fed into said cavity and flows into said ducts passing through the filtering surfaces of said filtering membranes.

4. The apparatus as claimed in claim 2, wherein the rotation movement of said shaft is given by a motor driven and controlled, through an inverter, by said monitoring and control unit, means being provided to measure an amperometric absorption of said motor in signal communication with said monitoring and control unit, said monitoring and control unit including means for processing a value of said amperometric absorption in combination with said pressure value PT2 detected by said second sensing means to control said inverter and to determine the rotations per minute variation of said motor.

5. The apparatus as claimed in claim 1, wherein said first valve means include a second pneumatically controlled valve and a third servocontrolled valve located along said permeate outlet circuit, said second valve being arranged upstream said third valve and pneumatically driven through pneumatic actuation means.

6. The apparatus as claimed in claim 5, wherein said flow rate detection means are arranged along said permeate outlet downstream of said third valve.

7. The apparatus as claimed in claim 1, wherein said second valve means include a first valve located along said retentate circuit and adjusted to said first pressure PT1 and a fourth valve located in a shunt of said retentate circuit bypassing said first valve, said fourth valve being adapted to be opened during said backwashing process.

8. The apparatus as claimed in claim 1, which also includes washing means having a plurality of nozzles arranged approximately perpendicular to a longitudinal extension of said filtration bell so that jets sprayed from said nozzles hit approximately tangentially said rotating filtering membranes.

9. The apparatus as claimed in claim 1, wherein said filtering means include at least a first and a second plurality of rotating filtering membranes stacked and integral, respectively, with a first and a second shaft rotating with respect to said filtration bell and arranged along axes parallel to each other, wherein said first shaft is internally provided with at least one cavity in communication, at one end, with said first plurality of membranes and, at an other end, with said permeate outlet circuit, said second shaft is internally provided with at least one cavity in communication, at one end, with said second plurality of membranes and, at an other end, with said permeate outlet circuit, and wherein said first and second plurality of membranes being arranged reciprocally alternated in a longitudinal direction so as to at least partially overlap each other.

10. A method for filtering liquid products, in particular organic liquids, in an apparatus including a filtering unit provided with rotating filtering membranes, a permeate outlet circuit where filtered liquid flows toward a collecting tank and a retentate return circuit where unfiltered liquid is let into said filtering unit to be filtered again, said method including a filtration process of said liquid products and a backwashing process of said filtering membranes, the method comprising:

detecting at preset time intervals $\Delta T$ during said filtration process the permeate flow rate FIT in said outlet circuit and the differential pressure Dp between a first pressure PT1 in said return circuit and a second pressure PT2 in said permeate outlet circuit;

when a threshold value of said flow rate FIT and/or said differential pressure Dp is reached in respect to preset respective values, closing said permeate outlet circuit such that said second pressure PT2 increases; and decreasing said first pressure PT1 in said retentate return circuit such that filtered liquid flows back through said filtering membranes to carry out said backwashing process while said filtering membranes continuously rotate.

\* \* \* \* \*